United States Patent
Zhang

(10) Patent No.: US 10,817,787 B1
(45) Date of Patent: Oct. 27, 2020

(54) METHODS FOR BUILDING AN INTELLIGENT COMPUTING DEVICE BASED ON LINGUISTIC ANALYSIS

(71) Applicant: Guangsheng Zhang, Palo Alto, CA (US)

(72) Inventor: Guangsheng Zhang, Palo Alto, CA (US)

(*) Notice: Subject to any disclaimer, the term of this patent is extended or adjusted under 35 U.S.C. 154(b) by 77 days.

(21) Appl. No.: 15/677,040

(22) Filed: Aug. 15, 2017

Related U.S. Application Data

(63) Continuation-in-part of application No. 13/798,258, filed on Mar. 13, 2013, now abandoned.

(60) Provisional application No. 61/698,640, filed on Sep. 9, 2012, provisional application No. 61/682,205, filed on Aug. 11, 2012.

(51) Int. Cl.
| | |
|---|---|
| *G06N 5/02* | (2006.01) |
| *G10L 15/18* | (2013.01) |
| *G10L 15/22* | (2006.01) |
| *G06N 20/00* | (2019.01) |
| *G06F 40/30* | (2020.01) |
| *G06F 40/284* | (2020.01) |
| *G06F 40/295* | (2020.01) |

(52) U.S. Cl.
CPC ............ *G06N 5/02* (2013.01); *G06F 40/284* (2020.01); *G06F 40/295* (2020.01); *G06F 40/30* (2020.01); *G06N 20/00* (2019.01); *G10L 15/1815* (2013.01); *G10L 15/22* (2013.01)

(58) Field of Classification Search
CPC .............. G06F 17/2785; G06F 17/289; G06F 17/2872; G06F 17/277; G06F 17/278; G10L 25/78; G10L 15/22; G10L 15/265; G10L 17/02; G10L 15/1815; G10L 17/2785; G06N 5/02; G06N 20/00
See application file for complete search history.

(56) References Cited

U.S. PATENT DOCUMENTS

| | | | |
|---|---|---|---|
| 5,418,717 A * | 5/1995 | Su | G06F 40/216 704/9 |
| 6,314,411 B1 * | 11/2001 | Armstrong | G10L 15/18 704/E15.018 |
| 6,901,399 B1 | 5/2005 | Corston | |
| 7,716,161 B2 | 5/2010 | Dean | |
| 7,814,244 B2 | 10/2010 | Thomas et al. | |
| 8,655,664 B2 * | 2/2014 | Tachibana | G10L 13/08 704/10 |
| 8,972,265 B1 * | 3/2015 | Lester | G10L 13/00 704/246 |
| 2003/0046556 A1 | 3/2003 | Attwater | |
| 2003/0233225 A1 | 12/2003 | Bond | |
| 2004/0267600 A1 | 12/2004 | Horvitz | |
| 2005/0080708 A1 | 4/2005 | Zhang | |

(Continued)

*Primary Examiner* — Fariba Sirjani

(57) ABSTRACT

Methods for building an intelligent computing device for interacting with users through voice or text conversations. The device uses linguistic analysis methods to detect hidden intentions in a user input, and produces machine responses that address the user's needs. The linguistic analysis includes syntactic and semantic and contextual analysis, and identifies source entities and target entities in the user expression together with a likelihood value that the source entity may have an intention to do something. The system further detects what the user actually needs and then produces machine responses that can perform tasks for the user.

16 Claims, 8 Drawing Sheets

(56) References Cited

U.S. PATENT DOCUMENTS

| | | |
|---|---|---|
| 2005/0216251 A1 | 9/2005 | Dorius |
| 2005/0216261 A1* | 9/2005 | Garner ............... G10L 25/87 704/215 |
| 2007/0050389 A1* | 3/2007 | Kim ................. G06Q 30/02 |
| 2007/0201630 A1* | 8/2007 | Smith ............... H04L 12/64 379/67.1 |
| 2007/0288439 A1* | 12/2007 | Rappaport ........ G06F 17/30867 |
| 2007/0294229 A1* | 12/2007 | Au ................ G06F 17/30864 |
| 2008/0133488 A1* | 6/2008 | Bandaru ............ G06F 17/2785 |
| 2008/0228481 A1* | 9/2008 | Mozer ............... G10L 15/26 704/247 |
| 2009/0100454 A1* | 4/2009 | Weber .............. G11B 27/034 725/9 |
| 2010/0299138 A1* | 11/2010 | Kim ................ G06F 17/2705 704/9 |
| 2011/0202512 A1* | 8/2011 | Pantanelli .......... G06F 17/2785 707/706 |
| 2012/0016678 A1* | 1/2012 | Gruber ............. G06F 17/3087 704/275 |
| 2012/0265819 A1* | 10/2012 | McGann ............ G06Q 10/00 709/204 |
| 2013/0138424 A1* | 5/2013 | Koenig ............. G06F 17/271 704/9 |
| 2013/0159340 A1* | 6/2013 | Blanco ............. G06F 17/30867 707/769 |
| 2014/0324749 A1* | 10/2014 | Peters .............. G09B 7/04 706/46 |
| 2017/0116989 A1* | 4/2017 | Yadgar ............. G10L 15/19 |

\* cited by examiner

METHODS FOR BUILDING AN INTELLIGENT COMPUTING DEVICE BASED ON LINGUISTIC ANALYSIS

CROSS REFERENCES TO RELATED APPLICATIONS

The present application is a Continuation-in-Part application and claims priority to U.S. patent application Ser. No. 13/798,258.

BACKGROUND OF THE INVENTION

Conventional human-machine interaction devices, such as conversational virtual assistants or chatbots that respond to human voice or text input are in most cases limited to accepting or responding to simple requests or commands, such as asking a question about the weather, a simple request to launch a software application to compose a message, or to find information of a particular type such as nearby restaurants.

When the input is not a simple directive that takes the form of a request or a command, but a narrative statement like telling a story, conventional systems cannot discern whether there is a hidden intention in the input that the user may want to do something to change or improve his/her current situation. For example, if the input is like one of the following:
1). "I like cellphones"
2). "I like your cellphone"
3). "I like my cellphone"
4). "I hate my camera"

a computer with conventional methods is not able to discern which of the above example expressions indicates a hidden intention from the user to do something about the object named "camera" or "cellphone", such as an intention to ask the computer to search information about a better camera or cellphone; or is not able to discern which of the above example expressions indicates a degree of intention from the user to acquire or to dispose a thing named "camera" or "cellphone", from the subtle differences among the expressions.

Furthermore, a problem with the conventional systems is that they are built mainly based on a huge amount of training data, which not only consumes time to collect and label, but also consumes much time and power for computers to process.

To build more advanced computer-based virtual assistants, or more intelligent machines in general, more advanced technologies are needed.

SUMMARY OF THE INVENTION

The present invention provides a system and language processing and understanding methods for building a more intelligent computing device that can help human users perform various tasks by more accurately understanding its users' intentions, and provide more relevant suggestions and actions.

The present invention provides methods for analyzing a user input that is not in a simple directive format, and detects hidden intentions that are not explicitly stated in the input expression. The conventional case is when a user's input is a simple directive, such as telling the computer "Please find a camera for me", in which the user's intention is clearly expressed in the input in the form of an imperative sentence as a command. However, when the user tells the computer "My camera is broken", or "It's cold here", the input is not a directive, but a narrative statement. In such a case, without knowing what the user wants to do or wants the computer to do, the computer will not be able to produce a desired or useful response to the user, such as asking whether the user wants to buy a new camera, or simply make a recommendation of certain cameras based on an automated search after discerning a hidden intention or need from the user, or offering to turn on the heating in the room, or changing the thermostat if it is connected with the computer.

In one aspect, the present invention performs syntactic and semantic analysis of the input expression, and detects a source entity that is more likely to be associated with a hidden intention. Because unlike the conventional approaches that handles input in the form of simple requests or commands, which assumes the current user of the device is the requester, the present invention specifically handles user expressions that are in a narrative style, in which multiple entities can be present. The present system detects a source entity that is associated with a hidden intention, and then determines a likelihood of the source entity wanting an action to be performed. The source entity can be a current user, or can be someone else related to the current user in some way. The present system defines relation types between various entities, and determines a likelihood value based on the relation type.

If the likelihood is above a threshold value, the present system generates a machine response that will be pertinent to the context of the human-machine conversation.

In another aspect, the present system detects what type of intention is associated with a source entity, and determines a likelihood based on the type of intention as detected, such as whether the source entity has a need to perform a specific type of action to improve the current situation.

In another aspect, the present system detects a target entity of an intended action. For example, if the user says "I don't like my camera", the present system detects that the target object of which the user has a negative attitude is the thing that is named "camera", and can produce a machine response relevant to the object of camera. In some embodiments, a target entity is represented by a complex phrase, and some of which involves terms that are members of the grammatical category of personal pronoun or possessive pronouns, which further requires more detailed linguistic analysis of the relation between the possessor of the target entity and the source entity. The present system determines a likelihood value for deciding whether to produce a machine response based on the results of the linguistic analysis.

In another aspect, the present system performs more detailed analysis of the type of the complex phrases that represent a target object, including disambiguation when multiple target entities are present in a single phrase with one of the possible entities being the intended target object, thus the present system can more accurately determine what the user wants the machine to do.

Various other aspects of the invention are also disclosed.

BRIEF DESCRIPTION OF FIGURES

FIG. 2 is a flow diagram illustrating the overall process of estimating the likelihood of a user making a purchase based on a user expression and the grammatical and/or semantic attributes of the terms in the expression, and then displaying an advertisement if the likelihood score is above a threshold.

FIG. 3 is an illustration of an exemplar embodiment of determining relevant advertising based on the grammatical attributes of terms in a user expression.

FIG. 4 is an illustration of another exemplar embodiment of determining relevant advertising based on semantic attributes of terms in a user expression.

FIG. 5 is an illustration of different groupings of terms based on semantic characteristics.

FIG. 6 is an illustration of an exemplar embodiment in determining relevance for advertising based on grammatical and semantic attributes.

FIG. 7 is a system diagram in accordance with one embodiment of the present invention.

FIG. 8 is an illustration of a method to determine relevant group promotions based on multiple user expressions.

DETAILED DESCRIPTION OF THE INVENTION

Figure 1:
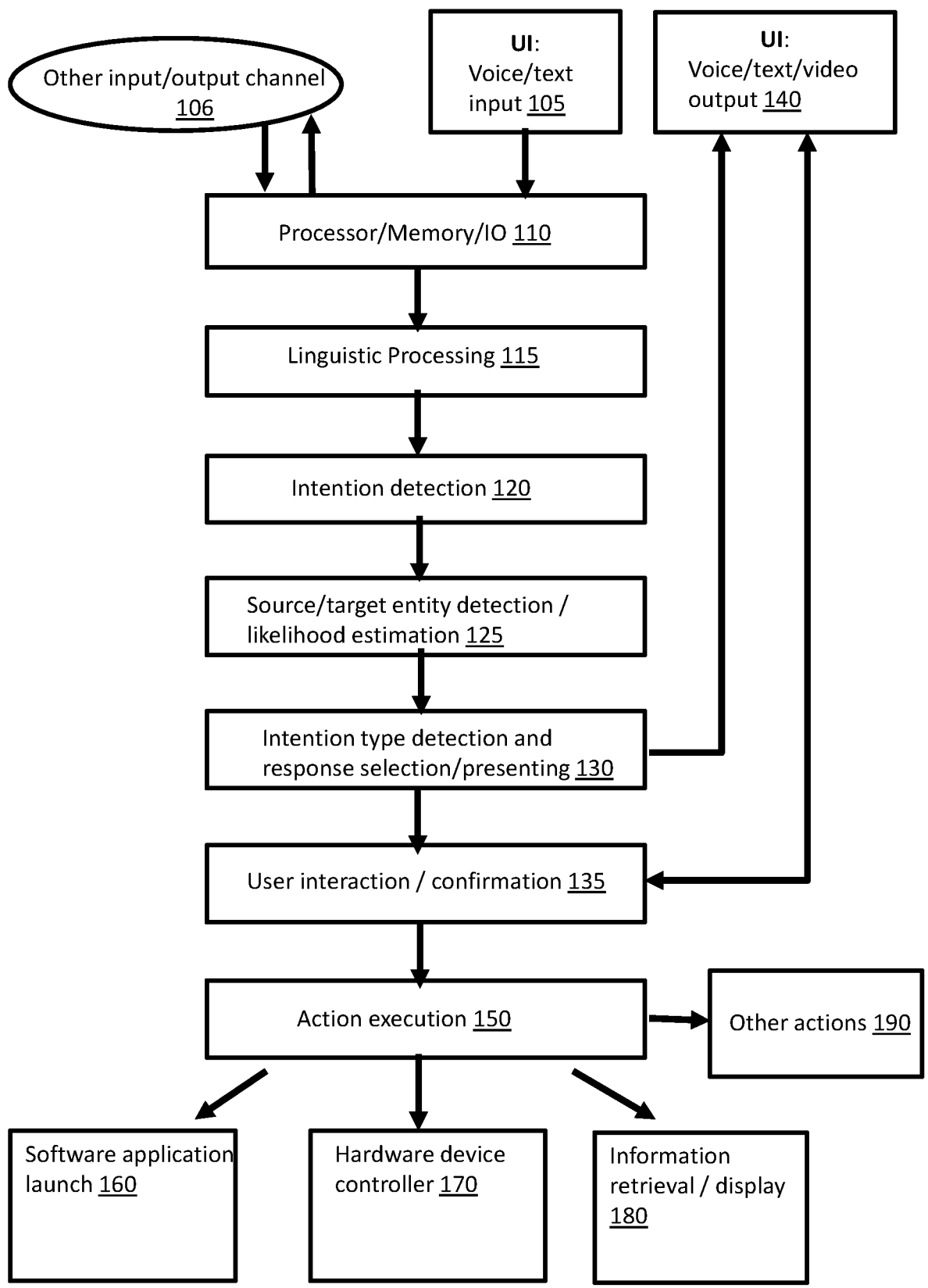
FIG. 1 is a brief illustration of a computing device executing the main steps of the methods provided in the present invention.

FIG. 1 is a brief illustration of a computing device executing the main steps of the methods provided in the present invention.

The hardware device (110) comprises one or more processors and coupled with memory modules and input/out controllers and devices that interface with its users and data sources. It can receive input directly from a user (105) or from other channels (108) such as other communication devices or storage devices or third party devices. The input can be in voice or text format. Once the input is received, the input data is passed to a linguistic processing module (115), which analyzes the input expression by detecting terms and their attributes, such as grammatical, semantic or contextual attributes. As will be described in more details below, through linguistic analysis, possible but hidden intentions implied by certain terms used in the input expression are detected (120). Then an entity that is the source or target of the intention is also detected (125). A source entity is usually a person mentioned in the input expression, but the person may or may not be the current user of the computing device. Then, an initial likelihood value of the source entity having the hidden intention is estimated based on the type of source entity (125), such as who the source entity is. Different likelihood values can be produced for different types of source entities. If the likelihood value is above a threshold, then an intention type can further be determined, which indicates what the source entity might want to do, such as to acquire or remove an object, change a state in the environment, etc., and the likelihood value can further be determined based on the detected intention type. If the likelihood value is above a threshold, then a response type can be selected from a data source according to the intention type (130). The response is output to the user interface (140) or other channels (105), and the response can be in either the voice, or text or video format, as part of the human-machine interaction (135), such that, the user can reply to the machine, or confirm a suggested action if the response contains a suggested action to be performed by the machine. If the user confirms, then the action execution module (150) is activated. The action can include launching a software application (160), or changing an operation state of a hardware device (170) that is mechanically or electronically connected to the computing device or controlled by the computing device, such as a switch on an electric or electronic appliance, etc., or retrieving and presenting information (180) that can help the user to perform an action by him/herself. Other types of actions (190) can also be performed, such as outputting and transmitting the detected intention or likelihood value to a third party or device for further processing or display. In some embodiments, the machine response can also be a video format even though the input is not in a video format, including drawings or videos that can show the user what actions to perform and how to do the task, etc.

In the following, more detailed descriptions about the steps performed by the computing device are provided.

To equip a machine with a level of intelligence in understanding certain hidden intentions from the human user input, the input needs to be analyzed at various levels. In the following, an input to the machine is called a user expression or simply an expression or an input in short.

An expression is a linguistic object produced by a user at any given time under any given context, either in the speech format or a text format. An expression can be one or more words, phrases, sentences, paragraphs, etc. For ease of illustration, in the present disclosure, the example expressions are simple sentences in the English language. It should be noted that the system and methods disclosed in the present invention can be equally applied to any other languages, and in forms other than simple sentences.

In some embodiments, user expressions are first broken into sentences, and a sentence structure or pattern is identified for analysis.

The present invention first identifies the components of a sentence, such as a word, a phrase, etc., by tokenizing such components into instances of terms, each of which can contain one or more words, and then identifies the grammatical attributes and roles of these components. The grammatical attributes include what is known as the parts of speech, such as a noun, a pronoun, a verb, an adjective, adverb, a preposition, etc., and the grammatical roles can include whether a word or phrase is the subject of a sentence, or predicate of a sentence, a direct object, or an indirect object, or a sub-component of the subject or predicate phrase, etc. In the present invention, the predicate of a sentence can be defined as the rest of the sentence other than the subject. For example, in the sentence of "I like digital cameras", "I" is the subject, and "like digital cameras" is the predicate of the sentence.

In some embodiments, the present system further identifies the components of a predicate as comprising a transitive verb signifying an action or a relation, plus a noun or a noun phrase as direct or indirect object of the transitive verb, such as in "I bought a camera" in which the word "bought" is an action verb, and the "camera" is a direct object of the verb; or an intransitive verb without an object noun, such as in "The camera broke"; or a linking verb plus an adjective, a noun or noun phrase, such as in "Camera is good", in which "is" is a linking verb, and "good" is an adjective functioning as a predicative, or other components as the complement of the adjective of the linking verb, such as "the book is easy to understand", in which "easy to understand" can be a complement of the adjective 'easy". In some embodiments, the adjective following a linking verb is called a "predicative".

In some embodiments, the system further identifies the grammatical roles of the sub-components of a multi-word phrase, whether the phrase is a subject, or a predicate, or a direct object, or an indirect object of the sentence. In the present invention, a multi-word phrase is defined as having a grammatical structure consisting of a head plus one or more modifiers. For example, in the phrase of "digital cameras", the word "digital" is a modifier, and the word "cameras" is the head of the phrase.

In some embodiments, the present system further identifies various semantic attributes of the words or phrases in the expression, such as commonly known semantic roles, as well as various semantic attributes including specific meanings or contextualized meanings of words or phrases.

It is important to note that such linguistic attributes are not present in the raw input, or not explicitly stated or indicated in the input expression as a raw data object. They need to be discovered using various methods, including using external data sources such as dictionaries of specific purposes and formats, various types of knowledgebases including tables and graphs, and algorithms for resolving ambiguities when associating attributes to the words or phrases.

When such basic linguistic attributes or types of information is discovered and attached to the terms in the expression, the present system further discovers one or more of the following elements.

1. An entity that is a source of a hidden intention. For example, a source entity of a hidden intention can be a person mentioned in the expression that carries a potential intention for a certain action, such as the current user of the computing device, or a friend of the current user, or someone else that wants an action to be performed, or other types of agent including an animal or an intelligent computer device that may have exhibited an intention to do something.

2. An entity that is the target of an intended action. For example, a target entity can be an object that the source entity intends to act on, like the thermostat in the room that the person would like a virtual assistant to adjust, or in certain cases a person or organization that is of interest. In some embodiments, a target entity may not be present in the input expression.

3. A state associated with either the source entity or the target entity, which can be a physical or mental state. For example, a state associated with a source entity can be a physical feeling, such as feeling hot or cold, or a mental state such as a person being happy or unhappy with or without something, or having a need for improvement or solving a problem, or having a positive or negative attitude or opinion towards something, etc. A state associated with a target entity can be represented by a description or opinion on the target entity produced by a source entity, or a third type of entity. For example, someone may say that "The camera is great", while someone else may say that "The camera is terrible", etc.

4. After discovering one or more of the above elements or attributes, the present system performs further logical steps to determine whether there is a hidden intention in the user expression, or whether there is an action being intended or desired by the source entity, optionally on a target entity. In some embodiments, a likelihood of such hidden intention is first estimated, for determining whether it is pertinent to the context to produce a machine response. The machine response can be a request for confirmation of a suggested action to be performed by the machine on behalf of the user, including certain tasks that can change the setting of certain hardware device, such as changing a state in a home automation device including turning on or off air-conditioning, heating, lighting, radio, TV, music player, video player, phone, etc., or performing software-based tasks such as retrieving information, composing messages, etc.

Discovering a Source Entity and Determining a Degree of Hidden Intention:

A source entity for a hidden intention can be detected by analyzing the grammatical or semantic attributes associated with a term in the input expression. In one embodiment, when the user expression contains a well-formed sentence, a grammatical subject in an active voice can be identified as a source entity. Furthermore, semantic attributes associated with a term can also be used for this purpose. For example, terms associated with the semantic role of an agent or actor can usually be identified as the source entity of a hidden intention. However, for a machine to produce a proper response, more refined definitions of different types of source entities are needed. As will be described in more details below, terms in a language representing grammatical attribute of a person, such as personal pronouns, and semantic attributes of person names or organization names, etc., can be used to identify potential entities of hidden intentions. Furthermore, terms from the grammatical class of possessive pronouns or possessive nouns can also be used to determine the source entity and the type of source entity.

When the machine is listening to or having a conversation with a current user, the source entity identified from the expression may or may not be the same as the current user. For example, in one case, the current user may tell the machine "I need a better cellphone", in which the source entity is the same as the current user. However, in another case the current user may tell the machine "My wife needs a better cellphone". And in yet another case the current user may tell the machine "My brother needs a better cellphone, or "My friend John needs a better cellphone", or "John's friend needs a better cellphone", etc.

When a term such as "I" is recognized in the expression, which has a grammatical attribute of being a first-person pronoun in nominative case, the probability will be high that the source entity in the expression involves the current user, even though there are cases that the current user is not the exact source entity of an intention, such as "I think John needs a new cellphone", etc. On the other hand, a second-person pronoun such as "you" or a third-person pronoun such as "he/she/they", or a person name such as "John", or a title associated with a person such as "the president" is recognized in the expression, especially when the person is a grammatical subject of the sentence, or having a semantic role of an agent or actor, the probability can be high that the source entity in the expression may not be the same as the current user.

In determining a degree of likelihood that the current user may have an intention to obtain a new cellphone, or may perform an action of acquiring a new cellphone, or may want the machine to perform an action related to a cellphone, a relation between the source entity and the current user is identified, and the likelihood can be determined based on the type of the relation.

For a machine to more accurately predict the human user's needs, especially the current user's needs, different types of relations can be pre-defined and stored in the machine's memory or other storage device.

In some embodiments, different distance measures can also be pre-defined for relations of different types, and stored. For example, the distance between a person and him/herself can be determined to be of a value of 1 on a 0 to 1 scale; the distance between a person and a person unknown to him/her can be determined to be of a value of close to 0, and in-between, the relation between spouses can be exemplarily determined be close to 1 in normal cases, and the relation between other direct family members or wouldbe family members can be of a greater value than a relation between indirect family members, which can in turn be greater or smaller than a relation between non-family members, such as friends, friend' friends, or co-workers, teachers, students, acquaintances, etc.

Generally, terms representing different types of people or relation can be grouped together into respective categories, and optionally tagged as such, and a relation type or strength can be pre-defined between two types of people. For example, terms representing the semantic category of family members such as "wife", "husband", "father", "mother", "daughter" "son", etc., can be grouped together, and tagged as family members, or more refined grouping can be used for spouse, children, parents, etc. Terms representing other types of relations such as "friend", or "boyfriend", "girlfriend", can also be grouped and tagged; terms representing other types of relations such as "co-worker", "boss", "teacher", "student", "acquaintance", "friend's friend", etc. can be grouped as needed and optionally tagged as such. The grouping results and their distance measures can be stored as part of a knowledgebase, such as a knowledge graph, or a lookup table.

Furthermore, terms representing possessive relations such as terms in the grammatical category of possessive nouns or pronouns, such as the English words "my", "your", "his/her", "my friend's", "john's", etc., can be used to further define the closeness between two entities. For example, the English phrase with a first-person possessive pronoun "my friend" can be assigned a closer distance to the current user than the phrase with a third-person possessive pronoun such as "his friend".

In general, different terms of the above grammatical or semantic category can be assigned with different roles in determining the distance measures, and further in determining the different degrees of hidden intentions from the respective source entities.

Thus, depending on the type of relation detected in the expression, the machine can determine a likelihood value of the current user having a hidden intention to perform an action, or wants the machine to perform an action. For example, if the source entity is the same as the current user or someone very close to the current user, the likelihood value can usually be higher than when the source entity is not the current user or an entity that is not the closest to the current user. And the specific value can be determined based on the specific types of relations and their corresponding relation distance measures.

In some embodiments, the machine produces a response only if the likelihood value is high enough, such as being above a threshold. For example, using the above methods, the machine can determine to produce a response to the user if either the current user or someone close enough to the current user such as a direct family member is the source entity that has a need, and the machine can suppress a potential response if the machine can determine that the source entity is a person having a remote relation with the current user.

When the types of relations are defined, in addition to predict a likelihood for the current user to have a hidden intention related to something, a likelihood for a source entity that is not the current user to have a hidden intention can also be determined based on the type of source entity and the type of relation. For example, if the current user tells the machine that "John's brother needs a better cellphone", the machine can determine a degree of likelihood of the person named John having an intention to acquire a cellphone for his brother, and a different degree of likelihood of John's brother having an intention to acquire a cellphone for himself. This way, the machine can produce conversational responses or even physical responses to the current user, such as suggesting for the current user to tell John or John's brother where to get the best deal of a new cellphone, or suggest to order one online, etc.

In some embodiments, a machine as a computing device can have multiple current users. For example, two or more people can have a conversation or text chat or email with each other with the content of the conversation or chat being available to the machine as input. In such a case, the machine can listen or process the input in the background, and interject with appropriate response if certain intention is detected from the conversation. For example, if one of the users says "My cellphone is broken", and it is detected by the machine, then the machine can produce a response such as "Do you want me to recommend some cellphone deals for you?", or simply provide some information about cellphones without an initial suggestion.

Detecting a State of the Source Entity:

The likelihood of a hidden intention can further be determined based on a description of a state with a source entity.

As described above, source entities are mostly represented by terms in a language that refer to living objects such as humans or human organizations, or in certain cases, also including certain types of animals or even some advanced computers like robots, and target entities are mostly represented by terms that refer to non-living things such as books, tables, vehicles, cameras, etc., that can usually be manipulated by humans. Subsets of terms in a language that have commonality in referring to human or non-human objects can be grouped together, and optionally tagged as such, and stored in a knowledgebase, so that in an input expression, source entities and target entities can be identified by first discovering terms and their group memberships or tags, and can be distinguished from each other.

A state with a source entity can be identified by analyzing terms in the input expression that represent a description or information about a physical or mental situation related to the source entity. Such terms and their semantic attributes can be discovered by matching the terms with entries in a special data source, such as a specially designed dictionary that encodes special meaning of terms representing various physical or mental states of a person, or using a pre-trained machine-learning model, etc. For example, expressions such as "I am interested in reading", "He wants to have a new camera", "My wife is happy", etc., contain terms such as "interested in", "happy", "wants to have", etc., and they can be identified as having semantic attributes of representing a physical or mental state of the source entity.

Depending on the specific purpose or scope of functionality of the machine designed to assist a human user, types of physical or mental states can be pre-defined, and subsets of words or phrases in a language that are considered representing specific types of physical or mental states can be grouped into classes or tagged accordingly, so that when a term in the input expression matches one of the terms in a specific group or tag, an estimate of the possibility that the content in the expression reveals a physical or mental state of the source entity can be produced. In some embodiments, a term in the specially annotated dictionary can further be associated with pre-defined weight values to indicate how likely the term will indicate a specific type of state in a given context. In some embodiments, an annotation of the possible contexts for the term to indicate a state is also included in the group of terms, or in a dictionary or knowledgebase.

For example, terms such as "happy", "great", "fantastic" can be grouped together or tagged as indicating a state of satisfaction, while terms such as "terrible" "stressed", etc., can be grouped together or tagged as indicating a state of dissatisfaction, which can further indicate a need for improvement.

More detailed descriptions of compiling dictionaries or tagging terms are disclosed in the U.S. patent application Ser. No. 13/798,258, which are incorporated herein with major contents recited below.

In some embodiments, when a source entity is detected with a state of dissatisfaction or need, the present system infers that a hidden intention to change the state, or to improve the current state, is present. For example, if the source entity in the input expression says "I am hungry" or "I need to eat", or I haven't eaten for 6 hours", etc., the system of the present invention matches the term "hungry" or "need to eat" or "haven't eaten" etc., with entries in a data source comprising terms representing a need for food. When a match is found, the system detects that there is likely a hidden intention from the source entity to obtain food. In some embodiments, the entries in the data source are assigned weight values representing the intensity of such needs. For example, "hungry" may be assigned a value of 0.9 on a 0 to 1 scale. The present system can then determine that the source entity has a high likelihood of having an intention to obtain food. Furthermore, as described above, the system detects that the source entity is the current user interacting with the machine by identifying the subject of the sentence being a first-person pronoun "I" in the English language. Together with the intention value of 0.9, the source entity relation distance value as described above can also be used, and a likelihood value, such as 0.95 for example, can be determined and output to another functional module. The functional module can then check whether the likelihood value is above a threshold or not, and if it is, the machine can produce a response with something like "Do you want me to recommend a restaurant for you?" Or "Do you want to know where the closest food place is?", or reminds the user with "There is food in the fridge", etc.

In the referenced disclosures recited below, various types of physical and mental states and intention types, such as intention based on an interest, a desire, a plan, a dissatisfaction, etc., are described, and methods for determining a likelihood of intention in association with different states or intention types are also described.

In some embodiments, the present system further detects the context of the input expression by detecting clues from various sources. For example, if the user tells the machine that "I am cold", the machine may detect that the source entity has a need for warmth as a hidden intention that is not explicitly indicated in the input expression. Before producing a response, the machine can detect whether the user is in his home or office or another location. If it is detected from other information sources, such as the geolocation of the machine that the user is in his/her home, the machine may respond with "Do you want me to turn on the heating for you?", etc. In addition to location information, in some other embodiments, time information can also be detected as a context. In some embodiments, the time and location can be detected from the input itself. For example, if the user says "it's cold today", or "it's cold yesterday", or "This room is cold", or "Their office is cold", etc., the machine can produce a response like the above only when it detects that the time or location is current.

In some embodiments, the machine may first respond by asking the user to confirm for a suggested action to be performed by the machine, and then carry out the action on behalf of the user. In some embodiments when the machine is mechanically or electronically connected with other hardware devices, and have a control over the state of such hardware devices, the machine can perform physical actions of changing the state of such hardware devices as to cause a change in the user's environment, which in turn can cause to change or improve the user's physical or mental state, For example, the machine of the present invention can be connected to the controlling units of various home appliances or home automation units such as air-conditioning, heating, lighting, radio, TV, music player, video player, etc. The controlling units can be an on-off switch or an operation state adjuster.

Thus, if the user talks to the machine by saying "I am cold", the machine can produce a response such as "Do you want me to turn on the heating for you?" and if the user confirms, the machine can physically turn on the heating, or adjusting the thermostat. If the user says "I am hot", then the machine can produce a response such as "Do you want me to turn on the air-conditioning for you?" and if the user confirms, the machine can physically turn on the air-conditioning, or adjusting the thermostat. If the user says "I am lonely", then the machine can produce a response such as "Do you want me to play some music for you?", or "Do you want me to call your friends for a chat?"; and if the user confirms, the machine can physically launch the phone or chat applications. This way, the machine of the present invention can change or improve the physical or mental state of the user by performing actions that physically change the user's environment. It is important to note that conventional virtual assistant devices usually require the user to specifically issue a command or directive such as "turn on the heating", "Can you play music for me?" etc., without being able to understand the user expressions that are not in the form of directives but in the form of normal narratives or conversational statements, such as "I am cold", or "I am happy", "It's getting dark.", etc., which contains hidden intentions to change or improve the physical or mental state of the user.

The actions performed by the machine can also include retrieving information that helps the user to perform other actions that can help improve the user's current state.

As can be seen in the above examples, the machine response can contain descriptions as written or verbal expressions that describe the suggested actions as solutions to a problem or to improve the physical or mental state. To compile such expressions or description, first, subsets of terms in a language that represent a specific type of physical or mental state or problem or attitude or opinions can be grouped together or tagged as such, and stored in a data source. For example, certain terms in the English language can be grouped together to form a type of term group or class if these terms represent a good or positive feeling or opinion or attitude, and other terms can be grouped together to form a different type of term group or class if these terms represent a negative feeling or opinion or attitude.

Then, for each term, especially a term in the group that represent negative feelings or opinions or attitude, one or more solution descriptions or expressions can be pre-defined and stored in a corresponding data source, and be retrieved to form part of the machine response. For example, if the term is "cold", then a solution descriptions such as "turn on the heating", or "turn up the thermostat", etc., can be stored in a data source, and when the machine detects the term in the input expression and identifies that it represents a physical or mental state associated with a source entity in the input expression, the machine can select one or more of the pre-defined solution descriptions associated with the detected term, and use the solution descriptions as part of the machine response for the user to confirm or select, or perform the solution action accordingly.

Discovering a Target Entity:

In some embodiments, a target entity is also discovered in the input expression. In some expressions, a target entity may not be present. For example, in the expression of "I am hungry", while the term "I" can be detected as representing a source entity, there is not a detectable target entity. On the other hand, in an expression such as "I am thinking about getting a new computer", or "I am interested in computers", the term "computer" can be detected as representing a target entity based on its being a grammatical object of a verb or of the verbal/predicative phrase "interested in". While grammatical object in a sentence is usually detectable, in some cases, the grammatical subject of a sentence can also contain a target entity. For example, in "My computer is working fine", or "His cellphone is broken", objects such as "computer" or "cellphone" are still considered a target entity for a hidden intention even though the terms representing them are in a grammatical subject of a sentence.

In such cases, the first-person possessive pronoun of "my", and third-person possessive pronoun of "his" further indicates a possessor of the target entity respectively, which would be "I", or "He". In some embodiments, such possessors can be treated as an implicit type of source entity from which a hidden intention to perform an action related to the target entity can be detected, in a similar way as described above.

To determine a likelihood of a hidden intention to perform an action related to the target entity, specific expressions are analyzed. In some embodiments, both a source entity and a target entity are explicitly present. For example, a user may produce expressions such as "I like my camera".
"I like his camera".
"I hate my cellphone".
"I hate John's cellphone".

Objects such as "camera" and "cellphone" are target entities, while "I" is a source entity that may have an intention to perform an action related to camera or cellphone, such as buying or disposing a camera or cellphone, each with a different degree of likelihood.

In the above examples, each of the target entity has a modifier that is considered as a member of the grammatical category of possessive nouns or pronouns. In detecting a hidden intention from a source entity to perform an action related to a target entity, both the description of the state or attitude of a source entity, and the relation between the source entity and the possessor of the target entity are used.

Detecting Hidden Intention Towards a Target Entity with a Possessive Modifier:

In the above examples, if the input expression is "I like my camera", in the present invention, the likelihood of the source entity having an intention to replace or dispose the target entity of "camera" is relatively lower than when the input expression is "I like his camera", as described in more details in the referenced disclosures. In contrast, if the input expression is "I hate my cellphone", in the present invention, the likelihood of the source entity having an intention to replace or dispose the target entity of "cellphone" or to acquire a new cellphone is much higher than when the input expression is "I hate John's cellphone".

As described earlier with source entities, given the same physical or mental state or attitude or opinion towards the target entity, the likelihood value of the source entity having an intention to perform an action related to the target entity can be determined based on a relationship distance measure between the source entity and the possessor of the target entity. For example, in "I hate my cellphone", the possessor of the cellphone is the same as the current user. In "I hate my wife's cellphone", the possessor of the cellphone is the spouse of the current user. In "I hate my friend John's cellphone", the possessor of the cellphone is a friend of the current user. In each case, when the source entity has a negative attitude or opinion towards a target entity, the likelihood of the source entity having an intention to replace or dispose the target entity can be determined as being inversely proportional to the distance measure of the relation between the source entity and the possessor of the target entity, e.g., the smaller value of relation distance, the greater value of the likelihood.

In contrast, when the source entity has a positive attitude or opinion towards a target entity, the likelihood of the source entity having an intention to acquire an object similar to the target entity can be determined as being proportional to the distance measure of the relation between the source entity and the possessor of the target entity. Thus, in "I like my camera", the possessor of the camera is the same as the current user, with a distance measure equal or close to zero, thus the likelihood of the current user having an intention to replace or dispose the camera can be determined to be low. In "I like my wife's camera", the possessor of the camera is the spouse of the current user, the relationship distance can be considered larger than a relationship with oneself, thus the likelihood of the current user having an intention to acquire a new camera increased since the relationship distance measure increased a little bit. In "I like my friend John's camera", the possessor of the cellphone is a friend of the current user. The relationship distance can be considered even larger than the other cases, thus the likelihood of the current user having an intention to acquire a new camera can be determined as also increased even more since the relationship distance measure further increased.

In general, when the target entity has a modifier, given the same source entity's attitude or opinion towards the target entity, the likelihood of the current user having an intention to perform an action related to the target entity can be determined based on the specific modifier term of the target entity, especially when such a modifier term is a member of the grammatical category of possessive nouns or pronouns, such as the first-person or the second or third-person possessive.

Detecting Hidden Intention Towards a Target Entity with a Non-Possessive Modifier:

In some embodiments, target entities have a modifier that is not a possessive modifier. For example, user expressions can be "I like tablet computers", "I don't like heavy computers", "I hate desktop computers", etc. In such cases, the machine of the present invention can still detect a hidden intention from the source entity and continue with an intelligent conversation or interaction with the current user.

For example, if the user expression is "I don't like heavy computers", conventional machine conversational devices may not know how to respond appropriately. They may say, "Do you want information about heavy computers", which can be irrelevant due to lack of a true understanding of the hidden meaning. However, a machine with the present invention will be able to respond with something like "I can recommend light computers for you", or "Do you want me to find good deals about light-weighted computers?", etc.

In the present invention, target entities are first identified. If a target entity name is a multi-word complex phrase comprising at least a head term and a modifier term, such as "heavy computers", with "heavy" as a modifier term, and "computers" as the head term, the modifier term is further analyzed. A term in the modifier that is an adjective, such as "heavy", is identified, then a semantic attribute of the term, such as its meaning of referring to heavy weight, is discovered by matching the term with entries in a general or special-purpose dictionary that contains annotation about the meaning of the term, or contains annotations of other terms that represent a different or opposite meaning to "heavy". Alternatively, additional information about the term "heavy" can be obtained from another dictionary or knowledgebase, including other terms that have a semantic attribute of a different meaning from "heavy", or being opposite to the meaning of "heavy", such as "light", or "light-weighted", etc., which can be called alternative terms to the original modifier term. Then, the machine can estimate how relevant it is to produce a response with the original modifier term of "heavy" being replaced by an alternative term, such as "light-weighted", to form another multi-word phrase, such as "light-weighted computers", as a name of an alternative object, with the head term being the same ("computer" in this case). If it is determined to be relevant, the machine can produce a response such as "I can recommend light computers for you", or "Do you want me to find good deals about light-weighted computers?", etc. This way, the machine will exhibit a much higher degree of intelligence by correctly understanding a hidden need of the user, as compared with conventional approaches.

In general, when pre-defining alternative terms and compiling a corresponding data source like a dictionary or knowledgebase for such alternative terms, an object class represented by a head term can first be identified. For example, the head term "computers" can represent a class of objects known as computers. Then, properties or attributes that define sub-classes of the class "computer", such as "desktop computers", "laptop computers", "tablet computers", "light-weighed computers", "heavy computers", etc., can further be identified, and terms represent such properties or attributes of different types of computers, such as "desktop", "laptop", "tablet", "heavy", "light" etc., can be compiled and stored in a knowledgebase for retrieval as alternative terms to each other. Furthermore, sub-groups of the properties or attributes that represent related or complementary attributes can further be defined, such as "heavy" and "light" can be defined as members of one sub-group that represent properties or attributes that are related or complementary or opposite or mutually exclusive to each other; and "desktop", "laptop", "tablet", etc., can be defined as members of another sub-group that represent properties or attributes that are related or complementary or opposite or mutually exclusive to each other.

The relevance of producing a response with the original modifier term replaced by an alternative modifier term having a different or opposite semantic attribute can further be determined by the source entity's attitude or opinion towards the original target entity. As illustrated with the above example expressions, the relevance can be determined based on whether the source entity's attitude or opinion towards the target entity is positive or negative. Usually, a larger relevance value can be determined if the attitude or opinion towards the target entity is negative, as it is more relevant to produce a response of this type as a suggested solution to a potential problem the source entity has, based on the information that the source entity has expressed a negative attitude towards the target entity with the original modifier term; and a smaller relevance value can be determined if the attitude or opinion is positive, which signals that the source entity is less likely having a problem with the target object, or is more likely satisfied with the target object. A threshold can be pre-defined; thus, the machine response is produced only when the relevance value is above the threshold.

Incorporation by Recitation:

The following are recitations from U.S. patent application Ser. No. 13/798,258, with the original references to figures in the drawing re-numbered.

An expression is a linguistic object produced by a user at any given time under any given context. An expression can be one or more words, phrases, sentences, paragraphs, etc. For ease of illustration, in the present disclosure, the example expressions are simple sentences in the English language. It should be noted that the system and methods disclosed in the present invention can be equally applied to any other languages, and in any forms other than simple sentences.

In some other embodiments, an advertisable commodity name list is first obtained or compiled, and the expression is analyzed when it contains an advertisable commodity name.

In some embodiments, user expressions are first broken into sentences, and a sentence structure or pattern is identified for analysis.

The present invention first identifies the components of a sentence, such as a word, a phrase, etc., by tokenizing such components into instances of terms, each of which can contain one or more words, and then identifies the grammatical attributes and roles of these components. The grammatical attributes include what is known as the parts of speech, such as a noun, a pronoun, a verb, an adjective, adverb, a preposition, etc., and the grammatical roles can include whether a word or phrase is the subject of a sentence, or predicate of a sentence, a direct object, or an indirect object, or a sub-component of the subject or predicate phrase, etc. In the present invention, the predicate of a sentence can be defined as the rest of the sentence other than the subject. For example, in the sentence of "I like digital cameras", "I" is the subject, and "like digital cameras" is the predicate of the sentence.

In some embodiments, the present system further identifies the components of a predicate as comprising a transitive verb signifying an action or a relation, plus a noun or a noun phrase as direct or indirect object of the transitive verb, such as in "I bought a camera" in which the word "bought" is an action verb, and the "camera" is a direct object of the verb; or an intransitive verb without an object noun, such as in "The camera broke"; or a linking verb plus an adjective, a noun or noun phrase, such as in "Camera is good", in which "is" is a linking verb, and "good" is an adjective functioning as a predicative, or other components as the complement of the adjective of the linking verb, such as "the book is easy to understand", in which "easy to understand" can be a complement of the adjective 'easy". In some embodiments, the adjective following a linking verb is called a "predicative".

In one embodiment, the system further identifies the grammatical roles of the sub-components of a multi-word phrase, whether the phrase is a subject, or a predicate, or a direct object, or an indirect object of the sentence. In the present invention, a multi-word phrase is defined as having a grammatical structure consisting of a head plus one or more modifiers. For example, in the phrase of "digital cameras", the word "digital" is a modifier, and the word "cameras" is the head of the phrase.

In the present invention, identifying such grammatical components is important in determining how likely the user who produced the expression will make a purchase of a commodity mentioned in the expression, or associated with what is mentioned in the expression, or is interested in something, and further determining whether an advertisement should be displayed to the user, or what kind of advertisement is to be displayed. For example, compare the sentences of (1) "I want to buy a computer."

(2) "They want to buy a computer."

Without performing a grammatical analysis to identify what the subject of each sentence is, an advertisement of computer may be displayed to the person who produced these sentences. In (1), the subject of the sentence is "I", thus an advertisement for computer displayed to this person can be considered relevant. However, in (2), the subject of the sentence is "they", and if the display of ads is solely dependent on the word "computer", in many cases, the ads may not be so relevant to the person who produced this sentence.

Furthermore, identifying the grammatical role of object of the verb "buy" is also important, for example:

(3) "The restaurant wants to buy a computer."

Without correctly distinguishing the subject of the sentence ("restaurant") from the object of the verb ("computer"), an ad for a restaurant may be displayed instead of an ad for a computer, and the result can be very irrelevant.

In some embodiments, semantic analysis can be performed to identify the meanings of the words and their relationships. For example, (4) "I have a computer, but I don't have a printer."

Without correctly interpreting the meaning of "have" as "possessing something", an advertisement for either a computer or printer can be displayed, but ads for computers in this case will be much less relevant than ads for printers.

In some embodiments, contextual analysis can be performed to identify the change in meanings of the words under specific context. For example, (5) "I don't like computers"

(6) "I don't like computers if they are too heavy to carry".

If one only looks at "don't like computers" in both (5) and (6), an advertiser may think that no computer ads should be displayed since the user displayed no interest in computers. However, when context information is identified, ads for computers that are not considered heavy, such as light-weighted laptop computers can be effectively displayed as being relevant when the expression produced by the user is (6).

Figure 2:
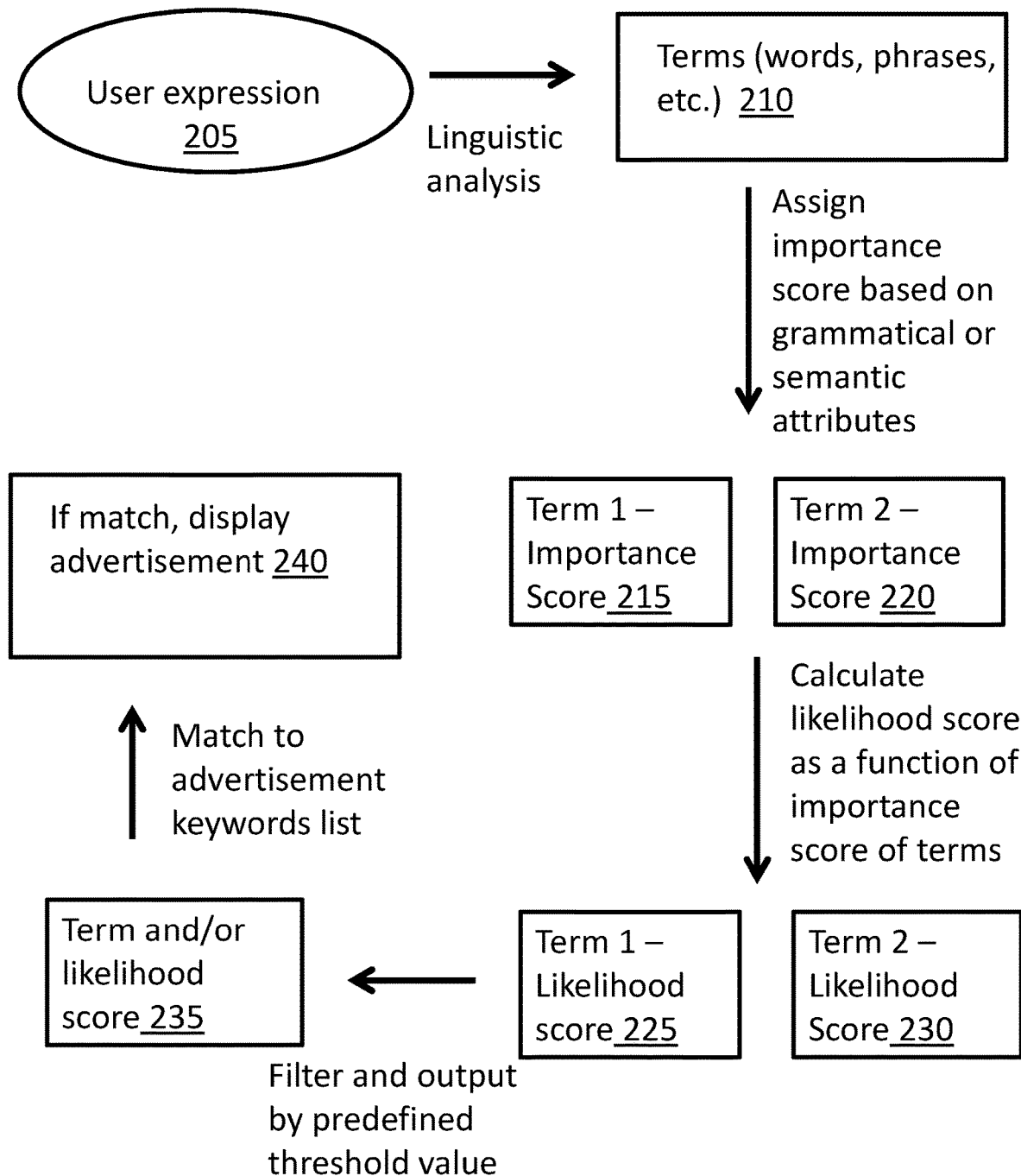
(FIGS. 2-8 in the following are incorporated from U.S. patent application Ser. No. 13/798,258, with the original figures re-numbered for incorporation.)

FIG. 2 is a general flow diagram of one embodiment of the present invention. It illustrates the overall process of estimating the likelihood of a user making a purchase based on a user expression and the grammatical and/or semantic attributes of the terms in the expression, and then displaying an advertisement if the likelihood score is above a threshold. In FIG. 2, a use expression (205) is obtained, and is tokenized in to terms (210). Then, grammatical or semantic attributes associated with the terms are identified, and each term can be assigned an importance score (215, 220) based on the grammatical or semantic attributes, such as whether the subject is a first person pronoun, or a third person pronoun, or whether the verb indicates an intention to purchase something, etc. Then, a likelihood score (225), (230) can be calculated for one or more terms in the expression, or for the expression itself, which may contain one or more names of advertisable commodities. Then one or more terms can be selected (230) and output if the relevance score is above a threshold, and can be matched with an advertisement database. If one or more selected terms match an advertisement in the database, the advertisement can be displayed to the user.

In some embodiments, the likelihood of a user buying something can be estimated by the various grammatical attributes of the words and phrases used in the expression. For example, compare sentences (7) and (8) below.

(7) I need a computer.

(8) They need a computer.

In (7), the subject is "I", and its grammatical attribute of parts of speech is a pronoun, more specifically, it is a first person nominative pronoun. In (8), the subject is "they", which is also a pronoun in nominative case, but it is a third person nominative pronoun. The present invention can algorithmically assign a larger numeric value as an importance score to a first person nominative pronoun, and a relatively smaller value to a second or third person nominative pronoun to estimate the relevance. Furthermore, a larger numeric value can be assigned to a regular or proper noun (such as "computer" in this case) as its importance score; and a relatively smaller value can be assigned to a pronoun or a personal pronoun (such as "I" or "they" in this case) as its importance score. Furthermore, as will be described in more detail below with semantic attributes, different values can be assigned to verbs of various kinds. In this particular example, the verb "need" is associated with a meaning of "having a need of something", and can be assigned a relatively greater value as its importance score than some other words such as "clean" in "I/they may clean the computer".

Figure 3:
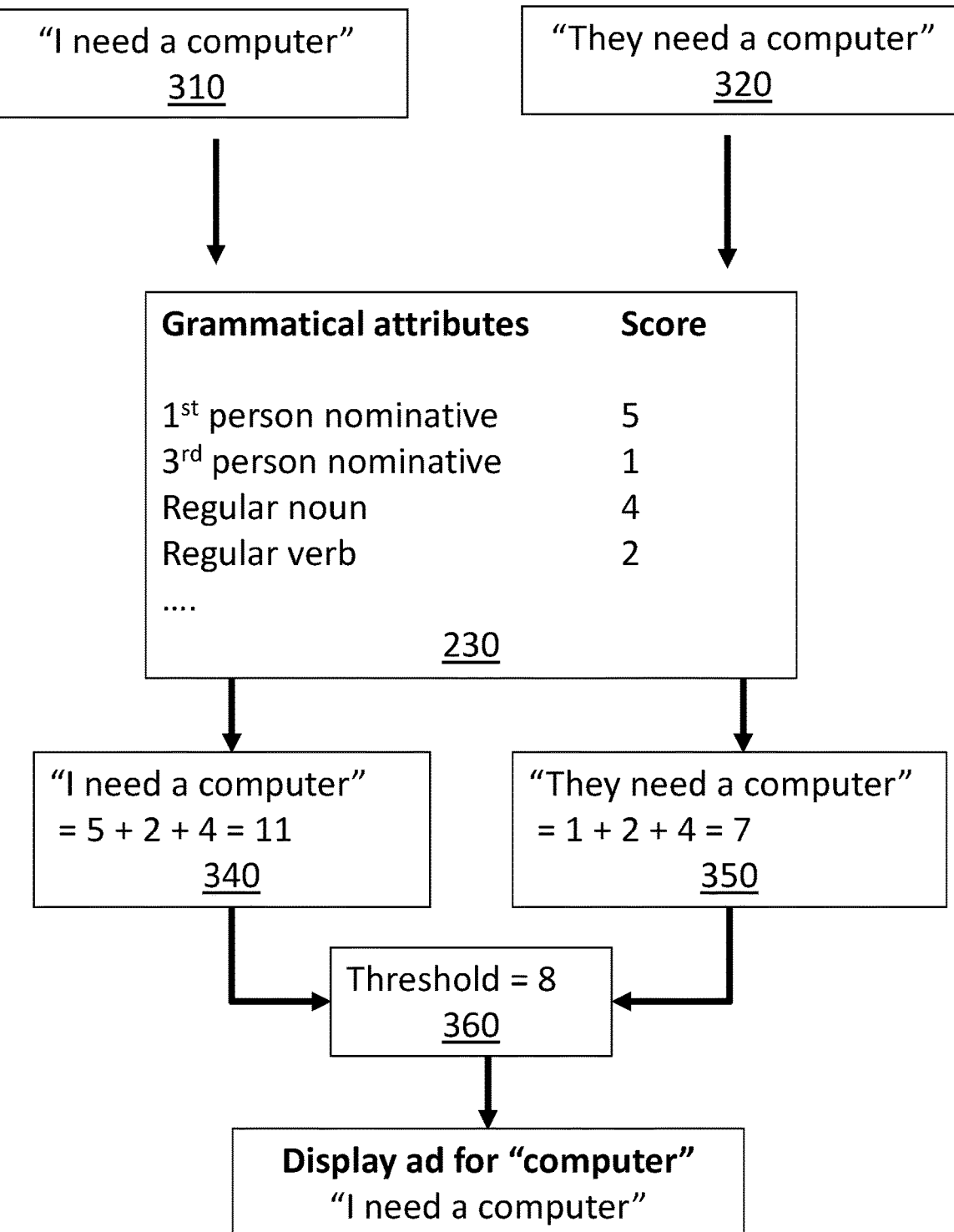

When the importance scores are assigned to the words or phrases in the expression based on their grammatical attributes, an overall score of the expression or an overall score of a target word or phrase in the expression can be calculated as a function of the importance scores of one or more individual words and phrases. FIG. 3 illustrates one embodiment of the present invention where scores are assigned to individual words based on grammatical attributes. Sentence 310 of "I need a computer" and sentence 320 of "They need a computer" can be broken into its component terms, and meaningful terms can be identified by a structural analysis process such as syntactic parsing process, and be assigned scores based on the grammatical attributes identified with the terms. The grammatical attributes 330 can be identified by a parser program with information from a dataset such as a dictionary. Dataset can be stored in an internal or external file, database, or other storage system. For example, if the importance score for the first person nominative pronoun "I" is 5, and that for a third person nominative pronoun ("they") is 1, and that for a regular noun is 4, and that for a regular verb is 2, then by adding the importance scores of all the elements that have a non-zero score value, an overall score 340 of 5+2+4=11 can be obtained for sentence 310 and an overall score 350 of 1+2+4=7 can be obtained for sentence 320.

In the present invention, scores like these two can be used as an estimate of the likelihood of the user buying a computer within a reasonable amount of time. If a threshold 360 is predefined, such as being 8, then sentence 310 can be selected as a relevant context for advertising for computer as a product or commodity. And if the word "computer" in sentence 310 matches a target keyword or the description of an advertisement associated with the commodity of computer, then such an advertisement can be displayed to the user either dynamically at the time the user makes an expression like sentence 310, or during a pre-defined period of time after the user has made such an expression.

The above is only a simple example for the purpose of illustrating how grammatical attributes of words and phrases in a user expression, such as what type of noun or pronoun and whether a noun or pronoun is a subject or object, together with what verbs are used in the expression, can be used to obtain an estimate of the likelihood of the user making a purchase of something. In implementation, score values, same or different, can be assigned to words or phrases with other grammatical attributes that are not exhaustively listed or exemplified here. And the range for the score values can be predetermined to be either an integer range, or decimal range, and the final scores can be normalized in various ways.

Semantic Analysis and Weighting Scores Based on Meanings of Terms

In some other embodiments, semantic and contextual analysis can be performed to more accurately determine the likelihood of the person making a purchase based on an expression the person has made. When conventional methods may utilize the information about the presence of certain words as indication of a user's intention to buy something, such as the English words like "buy" or "purchase", the present invention further determines to what degree of likelihood that the user may actually buy something, not only based on the grammatical attributes of various words or phrases used in the user expression, but also based on their semantic attributes and relationships. For example, in the following sentences, (9) "My computer is very slow."
(10) "My new cell phone is great."

A person with sufficient knowledge in English will likely determine that the likelihood of the speaker or user buying a computer is much higher than buying a cell phone. This is because the user's intention can be inferred from the meanings of the words or phrases used in the expression. As will be described below, when the meanings of the words and phrases in the expression can be captured with a sufficient degree of accuracy by a computer-assisted method such as the methods disclosed in the present invention, the likelihood of the speaker either buying a computer or a cell phone can also be accurately estimated by a computer program without human intervention.

In sentence (9), the user indicates that he or she has a computer, and the computer is slow, which further implies that the user is not happy about the computer he/she currently possesses. In (10), the user indicates that he or she has a new cell phone, and the cell phone is great, which further implies that the user is happy or satisfied about the cell phone he/she currently possesses. The present invention can algorithmically determine that when a user is not satisfied with something he/she already has, the likelihood of purchasing an alternative is relatively high, or at least higher than the likelihood when the user is satisfied with the goods or service the user already has.

Figure 4:
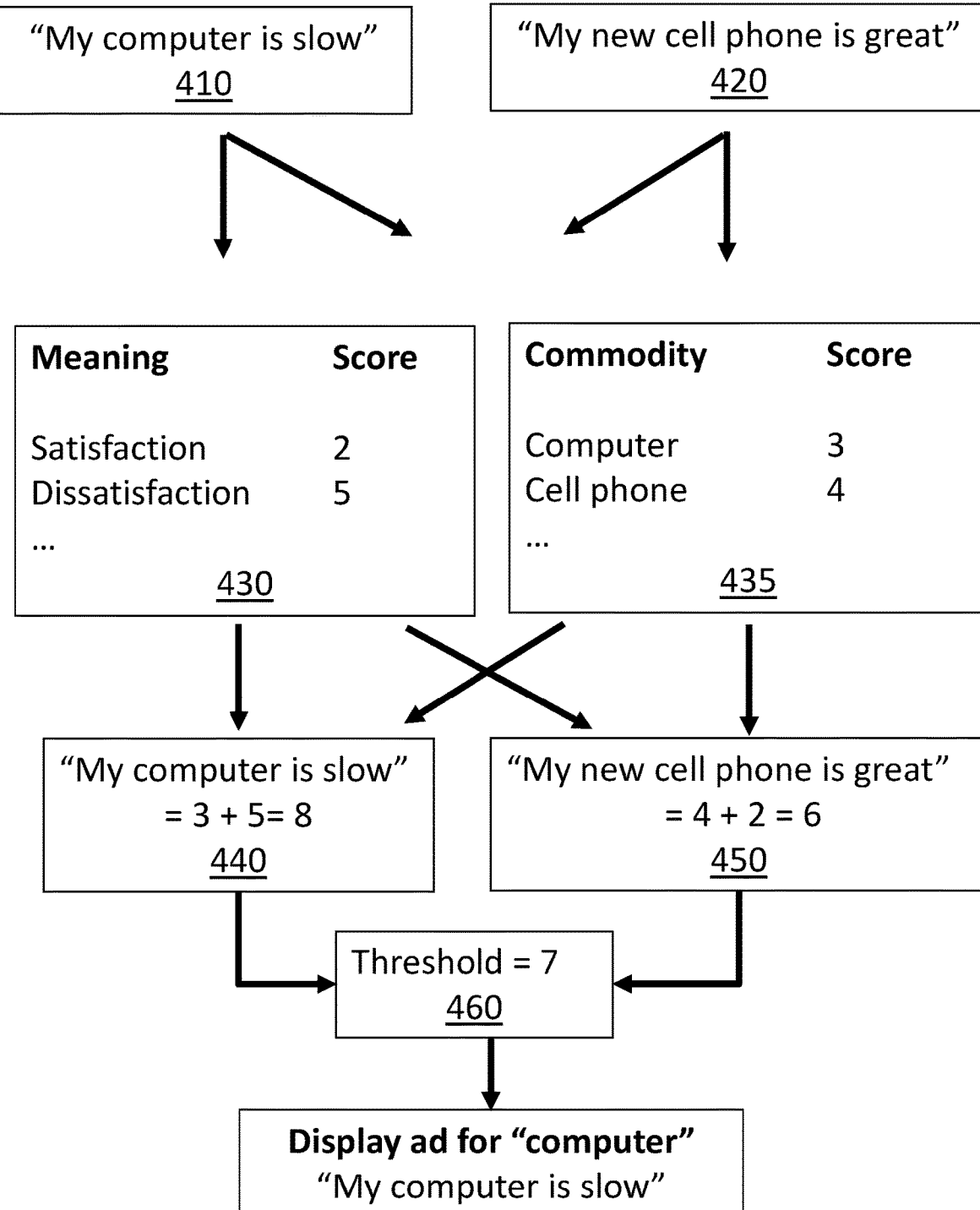

In the present invention, numerical values are assigned to words or phrases according to their meanings. For the purpose of determining the likelihood of a user making a purchase of a commodity, a word or phrase indicating a feeling of satisfaction towards a commodity they already have may be assigned a smaller value as its importance score, and a word or phrase indicating a feeling of dissatisfaction towards something they already have may be assigned a larger value as its importance score. FIG. 4 is an illustration of one embodiment of the present invention where importance values are assigned to words based on their meanings. In FIG. 4, sentences 410 and 420 are broken into their component terms. Dataset 430 comprises information about semantic attributes and score values. Dataset 435 comprises information about commodity names and score values. In sentence 410, the word "slow" can be assigned a value of 5, and in sentence 420, the word of "great" can be assigned a value of 2, as their term importance scores for the purpose of determining the likelihood of the user making a purchase. In addition to these words, the word "computer" can be assigned a value of 3 based on it's being the name of a specific type of commodity, and the word "cell phone" can be assigned a value of 4 based on its being the name of another type of commodity which may be different from a computer in terms of price, usage, or purchase frequency, etc.

Then, as is described above with the grammatical analysis, an overall score of the expression or an overall score of a target word or phrase in the expression can be calculated as a function of the importance scores of one or more words or phrases in the expression, and can be used as a quantitative estimate of the likelihood of the user making a purchase of a targeted commodity. For example, the overall score 440 for sentence 410 can exemplarily be 3+5=8, and the overall score 450 for sentence 420 can exemplarily be 4+2=6. The two scores can be used as an estimate of the relative likelihood of the user buying a computer or a cell phone, respectively. Again, a threshold can be determined, and the expression or the target term that has a score above the threshold can be considered relevant context for displaying an advertisement for the commodity the name of which is contained in that expression. In this example, an advertisement for computer can be considered more relevant than an advertisement for cell phone in this specific context.

In the present invention, a dictionary or word list is first compiled containing one or more words used in a language, storing their meanings which can provide clues in determining the likelihood of the user buying something, and optionally, a numerical value can be attached to each word in the list or dictionary to indicate how strong the tendency of making a purchase can be inferred from an expression with the presence of the word. In the present invention, the methods for selecting which word or words to be included in the list or dictionary, and what numerical values to be assigned to each word are based on a number of principles as exemplarily described below.

The present invention identifies a number of factors and their linguistic indicators that can contribute to a user's purchasing decision. As is known in common psychology, humans have needs, and they purchase goods/services to meet their needs, fill their deficiency, or achieve satisfaction at various levels. And humans also have different interests, and they purchase goods/services to satisfy their interest as well.

One embodiment of the present invention is to identify words or phrases of a language that indicate a need, or a deficiency, or a desire, or an interest, such as the English words "need", "want", "lack", "not enough", "bad", "desire", "interested in", "like", etc., and optionally, pre-assign a numerical value to each of such words as their default importance score for the purpose of determining the likelihood of making a purchase when such words are used under certain context.

Another embodiment of the present invention is to identify words or phrases of a language that indicate a sufficiency, or satisfaction. For example, English words such as "enough", "great", 'good", "happy", "satisfied", "comfortable", "not bad", etc., can be identified as belonging to this category. Optionally, a numerical value can be pre-assigned to each of such words as their default importance score for the purpose of determining the likelihood of making a purchase when such words are used under certain context.

Another embodiment of the present invention is to identify words or phrases that indicate a state of possession of some commodity. For example, English words or phrases such as "have", "has", "had", "possess", "got", "gotten", etc., can be identified as belonging to this category. Optionally, a numerical value can be pre-assigned to each of such words as their default importance score for the purpose of determining the likelihood of making a purchase when such words are used under certain context.

Another embodiment of the present invention is to identify words or phrases of a language that indicate an action to acquire or to remove. For example, English words such as "buy", "purchase", 'own", "remove", "get rid of", "dispose", "throw away", etc., can be identified as belonging to this category. Optionally, a numerical value can be pre-assigned to each of such words as their default importance score for the purpose of determining the likelihood of making a purchase when such words are used under certain context.

Another embodiment of the present invention is to identify words or phrases that indicate a state of intention or plan for action. For example, English words or phrase such as "going to", "plan to", "about to", "let's", etc., can be identified as belonging to this category. Optionally, a numerical value can be pre-assigned to each of such words as their default importance score for the purpose of determining the likelihood of making a purchase when such words are used under certain context.

Another embodiment of the present invention is to identify words or phrases that indicate a point of time in the past, present, or future, and time duration, as an indication of the likelihood of purchasing certain goods/service at certain point of time. For example, English words or phrase such as "now", "yesterday", "next week", "next month", etc., can be identified as belonging to this category. Optionally, a numerical value can be pre-assigned to each of such words as their default importance score for the purpose of determining the likelihood of making a purchase when such words are used under certain context. For example, a future tense can imply a planned action, thus is more likely to have a yet-to-be-met need. On the other hand, a past action may imply a generally lower probability that the action will be repeated any time soon, while in some cases, certain action do repeat often.

A related embodiment to using future tense or time expression is to analyze the text expressions in a user's electronic calendar or task list, based on the assumption that calendar events and tasks are future events being planned, and are more likely related to some yet-to-be-met needs, thus providing an advertising opportunity.

Another embodiment of the present invention is to identify words or phrases that indicate a state of urgency for action. For example, English words or phrases such as "desperately", "urgently", etc., can be identified as belonging to this category. Optionally, a numerical value can be pre-assigned to each of such words as their default importance score for the purpose of determining the likelihood of making a purchase when such words are used under certain context.

Another embodiment of the present invention is to identify words or phrases that indicate a degree of intensity for need, desire, which in turn indicate the degree of urgency for action of purchasing certain goods/service. For example, English words or phrase such as "extremely", "very", "absolutely", etc. can be identified as belonging to this category.

Another embodiment of the present invention is to identify certain attributes of goods or services, such as their price range, availability, consumption patterns, durability, frequency of purchase, etc.

The above are exemplar categories of attributes that can be identified and associated with words or phrases in a language, and recorded in a dictionary. These examples are not exhaustive, but illustrate the principle of the methods of the present invention. Many other attributes can be identified in a similar way and can be used for the same purpose without deviating from the principle and spirit of the present invention as exemplified above.

Figure 5:
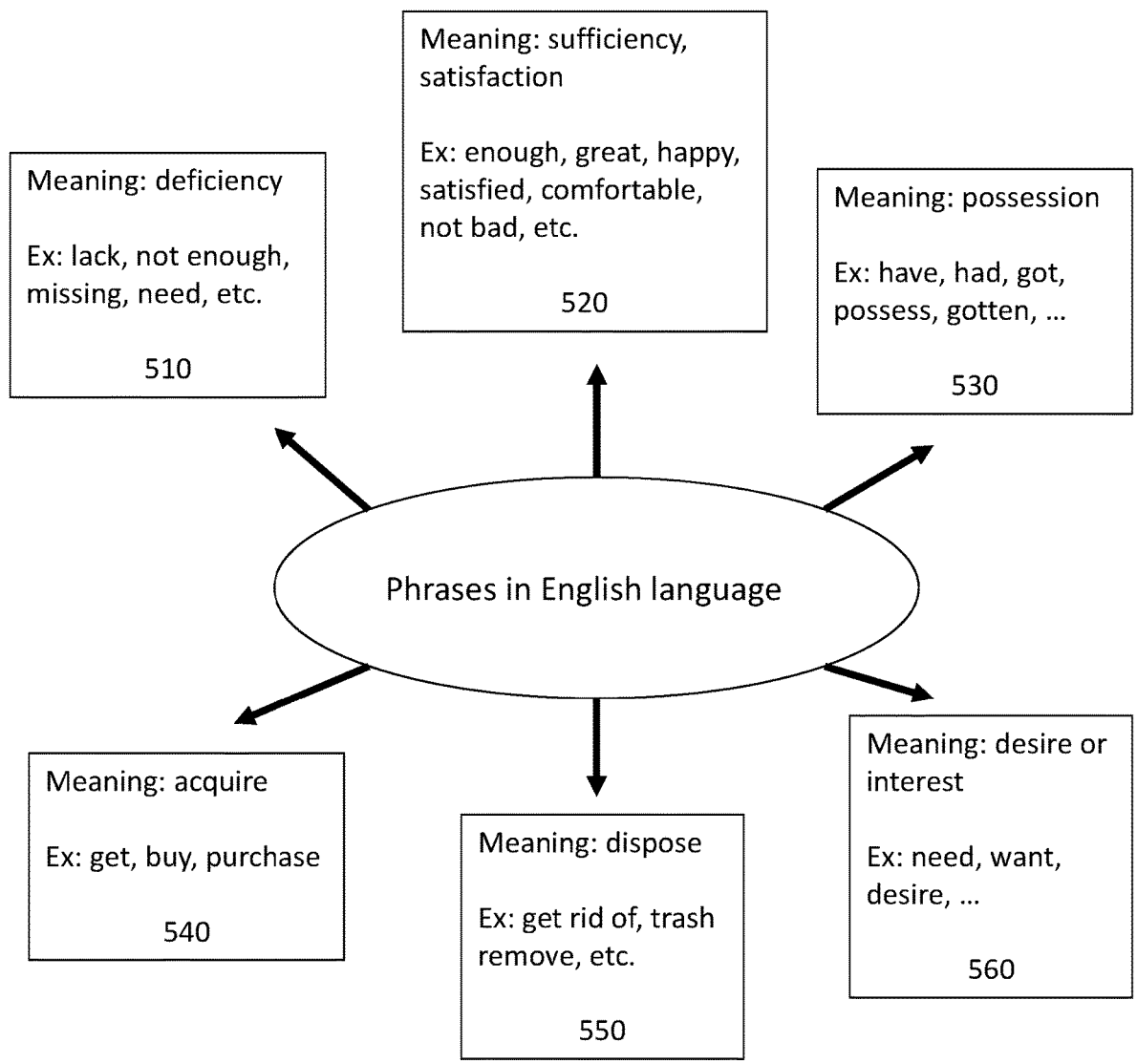

FIG. 5 illustrates exemplar groups of words in the English language and their semantic attributes in one embodiment of the present invention. The phrases can be placed in groups that have similar meanings, or labeled as such. For example, words in Group 510 are all related to the concept of deficiency, while words in Group 550 are all related to the concept of disposal. Words can be identified in one or more groups, such as the word "need" appearing in Group 510 as well as Group 560. The illustrated groupings or labeling are just one method of identifying semantic attributes of words and terms, and such a method is not limited to just the illustrated groups in FIG. 5.

Semantic+Grammatical Analysis

The semantic analysis as described above can be used either alone or in conjunction with the grammatical analysis of the user expression, as described below.

In some embodiments, both grammatical attributes and semantic attributes are used for the determination of the likelihood of a user making a purchase based on a user expression. For example, compare the following two sentences.

(11) I don't like my computer.
(12) I don't like computers.

In (11), the presence of the word "my", with its grammatical attributes of being a first person possessive pronoun as a modifier of the head noun of "computer", indicates that the semantic attribute of dissatisfaction indicated by the meaning of "don't like" is associated with a specific instance of computer that is currently in the user's possession. With such attributes, the present invention can algorithmically determine that the user is likely to purchase a different computer in order to reduce his or her dissatisfaction with his or her current computer. However, in (12), with the absence of the word "my", the semantic attribute of dissatisfaction indicated by the meaning of "don't like" is associated with the commodity of computer as a whole, and is not necessarily currently in the user's possession. In such a case, purchasing a computer is not likely to reduce the user's dissatisfaction, thus the likelihood of the user purchasing a computer is low.

Also as illustrated above, other grammatical attributes such as first person, second person, or third person subject or object, and grammatical attributes such as the present tense, past tense, or future tense, etc., of verbs in the English and other languages can all be used to determine the likelihood. For example, an expression with a first person subject using a present or future tense verb form indicating an intention to acquire something, such as "I will buy a computer soon", can be assigned a much larger importance score than a third person subject using a past tense verb form, such as in "He bought a computer last week". The difference can be identified by the future tense of the verb "will buy" and the past tense of the verb "bought", as well as the time expression of "soon" and "last week".

Below is another example of combining the grammatical and semantic attributes with the sentence structure Subject+ Linking verb+Adjective. In the following example sentences,

(13) My camera is amazing.
(14) His camera is amazing.
(15) My camera is terrible.
(16) His camera is terrible.

Figure 6:
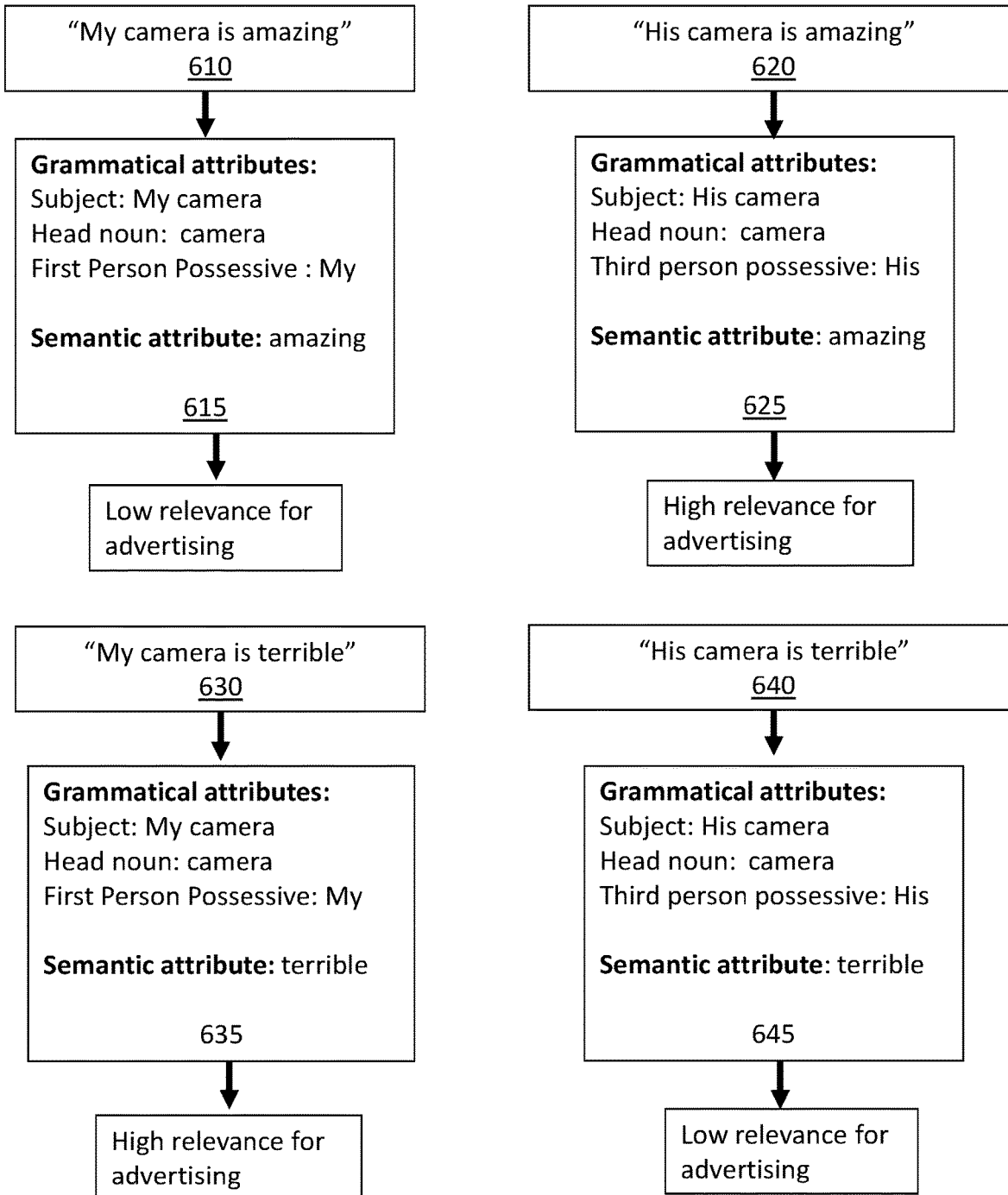

For a computer system to estimate the likelihood of the user making a purchase of a camera, both grammatical and semantic attributes need to be identified. FIG. 6 illustrates an embodiment of the present invention which identifies the grammatical and semantic attributes of the above four example sentences to determine the advertising relevance.

Sentence (13) is shown as sentence 610 in FIG. 6. Grammatical and semantic analyses are performed to obtain the grammatical and semantic attributes in 615. The subject of sentence 610 is "My camera" with a head noun of "camera" and a first person possessive modifier of "my". The semantic attribute is "amazing", which signifies a state of satisfaction.

Sentence (14) is shown as sentence 620 in FIG. 6. Grammatical and semantic analyses are performed to obtain the grammatical and semantic attributes in 625. The subject of sentence 620 is "His camera" with a head noun of "camera" and a third person possessive modifier of "his". The semantic attribute is "amazing", which signifies a state of satisfaction. Sentence (15) is shown as sentence 630 in FIG. 6. Grammatical and semantic analyses are performed to obtain the grammatical and semantic attributes in 635. The subject of sentence 630 is "My camera" with a head noun of "camera" and a third person possessive modifier of "my". The semantic attribute is "terrible", which signifies a state of dissatisfaction or frustration.

Sentence (16) is shown as sentence 640 in FIG. 6. Grammatical and semantic analysis are performed to obtain the grammatical and semantic attributes in 645. The subject of sentence 640 is "His camera" with a head noun of "camera" and a third person possessive modifier of "his". The semantic attribute is "terrible", which signifies a state of dissatisfaction.

Using these grammatical and semantic attributes, a rule can be set up to produce an estimate of the likelihood of the speaker purchasing a camera. For example, one rule is to first identify the subject of the sentence, and assign a larger weight value or importance value to a head noun having a first person possessive pronoun as its modifier, and if the predicative of the sentence is carrying a negative connotation, or can be identified as having a semantic attribute of signifying a dissatisfaction or frustration, then, increase the importance score of the head noun, especially, if the head noun matches a commodity name that can be advertised to the user. With this rule, sentence 630 can be identified as indicating a higher likelihood of the speaker purchasing a camera and having a higher relevance for advertising cameras than sentence 640. Sentence 640, or its head noun of "camera" can be assigned a smaller weight value or importance value because the modifier of the head noun in the subject is a third person possessive pronoun, with the same predicative. This is an example of determining advertising relevance based on the grammatical and semantic attributes with context information.

In some embodiments, words or phrases in a language are first organized into different groups based on their semantic attributes, and the relevance score is determined by identifying the group membership of the words or phrase in the expression, as well as the grammatical context of the words or phrases, without specifically adding numerical values for each word.

For example, a rule can be set up to determine that if the following conditions are met, then a high relevance score can be assigned to words or phrases in the expression: a) if the modifier of the subject head noun is a first person possessive pronoun such as in sentence (15); b) if the head noun matches an advertisable word, or is a member of advertisable keyword group; c) if the predicative of the linking verb is a member of the adjective group that carries a negative connotation or signifies a dissatisfaction or frustration d) if the linking verb "is" is in a present tense. This rule does not require assigning importance score to a term as a function of the importance values associated with other terms in the expression. It only checks if certain words are members of certain term groups, or is labeled as such, such as the group of adjectives that carry a negative connotation, or signify dissatisfaction or frustration, or pronouns that signify a possession of a commodity, such as the first person possessive pronoun of "my", and certain context information, such as a head noun is modified by a personal pronoun, or the subject has a linking verb and a predicative, etc. An importance value can be assigned to the entire expression, and words or phrases that match an advertisable keyword can be selected if the importance value of the expression is above a threshold. This is equivalent to using ad hoc rules for each specific combination of words in certain groups in determining relevance.

Similar to the other embodiments as described above, in this embodiment, sentence (14) can still be determined to indicate a higher likelihood of the speaker purchasing a camera than sentence (13), due to the presence of the third person possessive pronoun "his", and the adjective "amazing" being in a adjective group for adjectives carrying positive connotation or its semantic attribute of signifying an admiration or a desire to acquire something, and the grammatical context of the adjective "amazing" being a predicative of a present-tensed linking verb "is".

As is described, using a combination of the grammatical and semantic attributes of the words and phrases in an expression can enhance the accuracy of the estimation of the likelihood of a user making a purchase based on the user's expressions. When both the grammatical and semantic attributes are used, importance scores for the individual words or phrases can be assigned using the methods as described above for embodiments that use the grammatical or semantic attributes separately, or can be adjusted for the combination of the two types of attributes. The likelihood score of the expression or a target term in the expression can be calculated using a similar method of addition or multiplication or a combination of both as described earlier, based on the importance scores assigned to the individual words or phrases in the expression.

It should be noted that the above are only examples, and more categories of semantic attributes and methods of combining with grammatical attributes can be used for the purpose of determining the likelihood of a user making a purchase based on the user's expression.

In addition to the attributes described above, sentence patterns or sentence structure types such as questions or imperatives or exclamations can all carry information about user's needs, interests, etc, and can thus be used for detecting such intent for advertising or recommendation purposes. For example, if a user asks questions such as "Does anyone have a golf club that I can borrow?" or "Do you know whether this type of fertilizer can be used for tomatoes?" etc., the user's need for a golf club or a fertilizer for growing tomatoes can be detected, and the likelihood of the user purchasing a related product can be estimated to a certain degree. Furthermore, certain imperative sentences can also indicate user interest or intent. For example, when a user says "Let's watch a movie this weekend", the likelihood of the user purchasing a movie ticket can also be estimated to a certain degree. Moreover, certain exclamation sentences can also indicate a user's interest or intent. For example, when a user says "Go Lakers!" the user's interest in watching a sports game can be estimated to a certain degree.

On the other hand, other grammatical elements such as negation words like "no", "not" in the English language, can also be used to make such estimate. For example, if the user says "Don't buy an iPad", then the degree of the user's interest or intent in buying an iPad can also be estimated.

Furthermore, the user expressions can be in original text format, or as an audio or video transcript from a conversation or comments.

Figure 7:
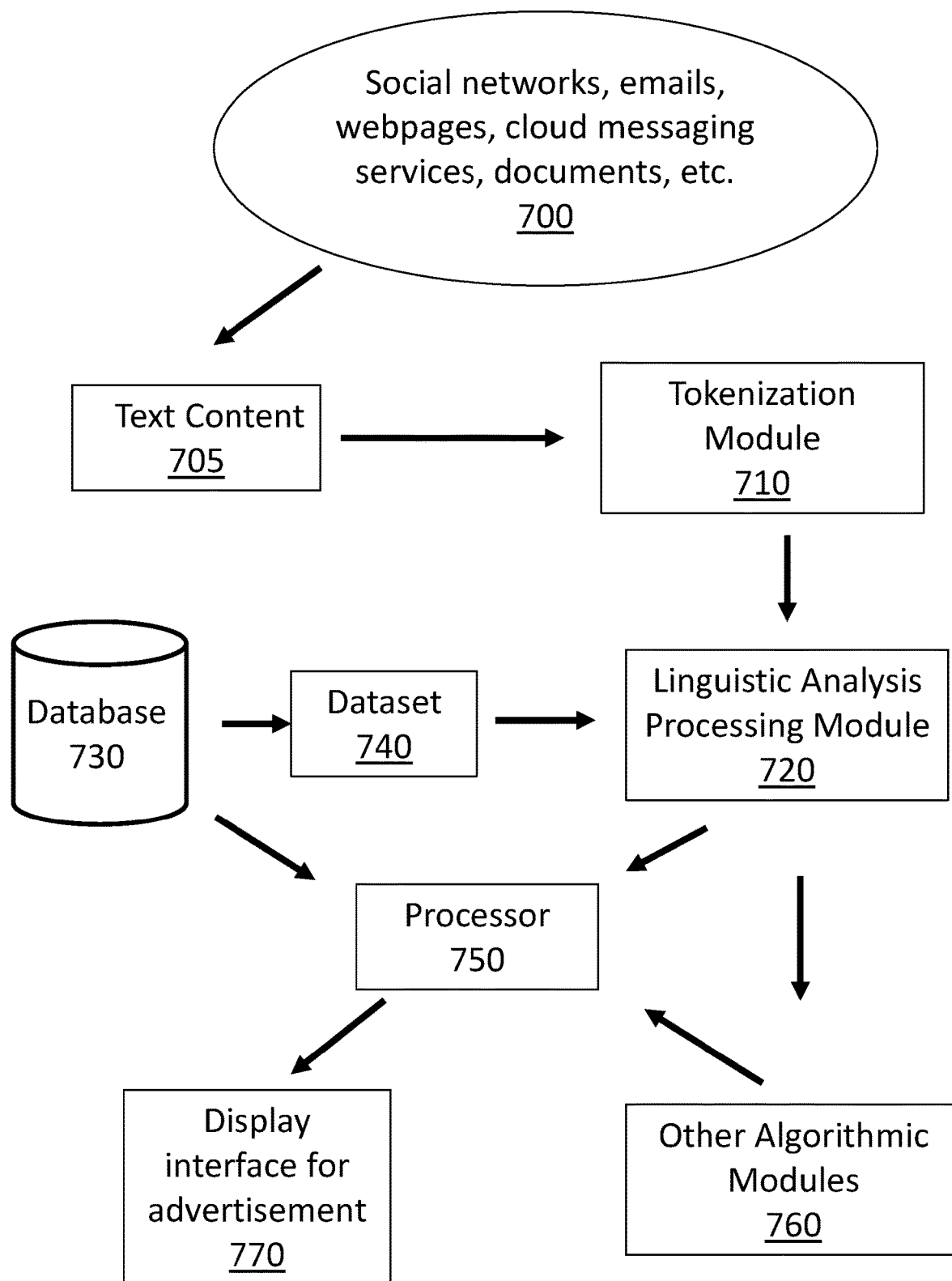

FIG. 7 illustrates a system configuration for one embodiment of the present invention. In general, a text content 705 can be obtained from content source 700, which can comprise of many different sources, including social networks, emails, webpages, mobile or non-mobile text messaging, documents, etc. Text content 705 is processed by tokenization module 710 to extract words or phrases, optionally, with a syntactic parser. The extracted terms are then sent to the linguistic analysis module 720, which can use a dataset 740 stored in a database 730 to assign numerical values to terms, or use algorithms to determine the values. Optionally, linguistic analysis module 720 can check group membership of terms. The results are processed by processor 750, optionally along with the results from other algorithmic modules 760 to determine the likelihood of a user being interested in or having an intention to purchase something, and if a relevant advertisement should be displayed in display interface 770 to a user. Display interface 770 can be within the same display interface that is displaying the content source 700, or in a separate interface.

Selling Advertisement Time or Space Based on Relevance

The methods for quantitatively estimate the likelihood of a user making a purchase or being interested in something based an expression the user has produced, and use that quantitative measure as a relevance score to select relevant advertisement to be displayed can be applied in many other areas.

In addition to display highly relevant advertisement, the relevance score can also be used for determining the price charged to the advertiser for the time or space of displaying the advertisements. For example, for a given commodity, if the relevance score is determined to be high, the time or space sold to the advertiser can be relatively high to match the potentially better effect of advertisement; and if the relevance score is determined to be medium or low, the price for displaying an advertisement can be relatively low to reflect the possibly reduced advertising effect.

Conventional online advertising methods, such as advertisement keyword auction method based on search query or social network comments or email contents, are mainly based on the presence or absence of a given keyword in a user expression; and such keyword are auctioned to the advertisers based on popularity. Such methods provide less information to the advertisers as to how effective the keywords can be for a particular advertisement. For example, if a user's expression contains the keyword "camera", advertisers of cameras will likely assume that it is highly relevant to an advertisement of the product of camera, and price for placing such an advertisement can be high. However, not all expressions containing the word "camera" are highly relevant to advertising for the product of camera. For example, if a user writes a comment on a social network or email "His camera is terrible", then, as can be determined by the methods described in the present disclosure, the likelihood of the user purchasing a camera in this case is low. With the conventional approaches, this type of difference cannot be detected, and the advertisers are not well served if they pay a high price only because the user mentioned the keyword of "camera".

However, in the present invention, the relevance score of the keyword for advertising based on a particular user expression can be made available to the advertiser, and the price for bidding for an advertisement for the keyword can be dependent on the relevance score as described above that indicates the likelihood of the user purchasing a camera. High prices can be charged for high relevance, and low price can be charged for low relevance. Since a lower relevance does not necessarily mean it is not relevant, there is still a good chance that the advertisement can yield a positive result. But the advertiser can determine whether a keyword with specific relevance score based on a specific user expression is worth the price for advertising. This way, the advertisers can be served in a more reasonable way.

Facilitating Group Purchase Advertising

Another embodiment in the present invention is to use the relevance score so determined to serve promotional sales with group purchase prices. This method can be especially effective in a social network or email advertising environment or other communications channels, as well as search engines. In such environments, sources where certain expressions are generated can usually be identified whether anonymously or not. Such sources include users' social network pages or email pages; and advertisements can be displayed to such users in a relatively more persistent user interface or more persistently retained open pages.

In some embodiments, the methods of identifying the likelihood of user interest or purchasing something can be applied to multiple users within a given period of time. For example, on a social network, numerous users are writing comments at any given time; and with emails, numerous email users are writing emails at any given time. In such environments, all or part of the comments or emails can be analyzed using the methods described above, and if a particular commodity name is found to be relevant or with a high likelihood of user making a purchase, this information can be used to inform the providers of the commodity, such that the commodity provider can decide whether this is a good chance to launch a promotional campaign by offering a group purchase price discount to the users. Since users of social networks or emails or other digital media who have expressed such intent are often traceable, either anonymously or not, group purchase advertisements can be displayed to the users who have expressed such intent to purchase the commodity.

Figure 8:
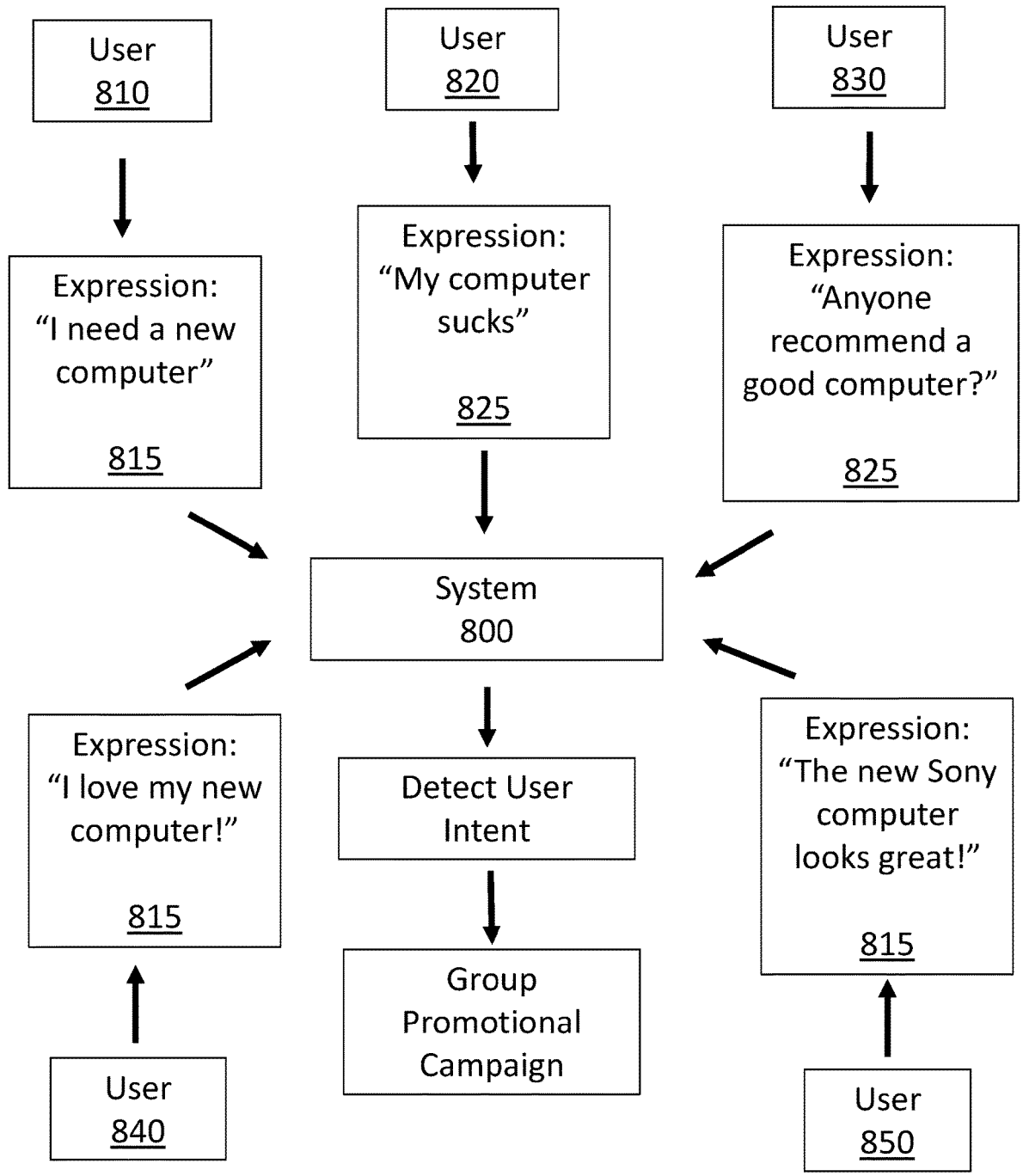

FIG. 8 is an illustration of one embodiment of the present invention where expressions from multiple users are analyzed to determine if a group discount or a promotional campaign should be launched. Users 810, 820, 830, 840, or 850 can each be a user of a social network, email service, cloud messaging service, instant messaging service, commenter on a blog or discussion forum, etc. An expression from each user's content is extracted and analyzed by system 800 to determine user interest or intention, and to determine if any relevant advertising can be associated with each expression. System 800 can be one embodiment of the system as described above. The extracted expressions can be obtained at different times in a given time period. Each expression involves the term "computer", and if the system determines that enough expressions involving the word "computer" merit advertising, and if the number of users having produced such expressions exceed a threshold, then a promotional campaign with a group price discount for computers may be initiated and relevant advertisements and recommendations can be displayed for the group of users.

Compared to the conventional approach of merchants advertising group discount offerings to solicit response from users whose intent is not known, the method of the present invention is based on known information from actual user expressions, thus can better target the users and more importantly, better serve both consumers and merchants.

Automatically and Dynamically Creating or Modifying a User Profile

The methods of performing grammatical and semantic analysis as described in the present invention can also be used to automatically and dynamically create or modify a user profile regarding the user's interest and other aspects. User expression produced by email or social network users can be analyzed from time to time, and as is described above, in certain cases, the estimation of the likelihood of user purchasing a commodity is based on the detection of user's interest in terms of what the user likes or does not like, what the user admires, or abhors, etc. such information can be used to automatically or dynamically build up a user profile or modify an existing one. Often when a user signs up an email service or a social network, the user may not willingly or completely disclose what his or her real interest is for privacy concerns, and the user's interest can change. Thus, targeted advertising to the user based on the static information provided by the user may not always be accurate in determining what the best advertisement is to serve. However, using the methods of the present invention as described above, a user's actual interest can be detected from the expressions the user makes, such as the comments on a social network, or emails. A dynamic user profile can be built up within a period of time when enough data is gathered, and the automatically detected topics of user interest can be added to the existing user profile to better serve the user or user community, such as making relevant recommendations or suggestion, as well as to better serve the commodity providers.

Automatically and Dynamically Suggesting Friends or Groups for Social Network Users With the ability of the present invention in detecting user interest, common topics of interest among multiple users can be identified. The results can be used to facilitate user group or community formation. In a social network environment, in addition to the static user profile created by the users, automatically and dynamically identified user interest can also be used to make suggestions for user to connect to like-minded people, or form discussion groups, even though some users never explicitly disclosed certain topic of interest. For example, a user may not specify in the user profile that he or she is interested in politics, but the user may actually spend a lot of time discussing about politics on a social network. As is described above, the method of the present invention can be used to analyze multiple users at the same time or within a specific time period. If many users are talking about something similar or sharing some similar views, such talks can usually be limited to the user's own friend circle. However, using the methods of the present invention, multiple users talking something similar can be discovered simultaneously, and common topics can be identified and user groups can be suggested to the users sharing similar views, such that, new user groups can be formed to expand the users friend circle, or to connect users with like-minded people.

The above are only examples of the methods and applications. The presently disclosed system and methods can also be applied to many other environments without deviating from the spirit of the principles and the methods described above.

What is claimed is:

1. An intelligent computing device for performing actions for a user based on linguistic analysis of a voice or text input, comprising:

a processor coupled with a memory module executing an instruction set, the processor is configured to perform the following steps:

receiving a user input produced by a current user of the computing device, wherein a physical form of the user input comprises a text or an audio, wherein the user input contains a user expression that is in a linguistic format of a statement that is different from a directive that functions as an explicit request or command;

tokenizing the user expression into instances of terms each comprising a word or phrase;

identifying a first term in the user expression;

discovering a semantic attribute associated with the first term, wherein the semantic attribute represents a state associated with a source entity, wherein the source entity refers to a person, wherein the source entity is represented by a term in the user expression, wherein the semantic attribute is not explicitly indicated in the user expression, wherein the state comprises a physical state or mental state described by the first term;

identifying a second term in a context of the first term, wherein the context of the first term comprises one or more terms in a sentence containing the first term or related to the first term, wherein the second term represents a source entity associated with the semantic attribute;

determining, for the user input, based on the state represented by the semantic attribute, and based on a type of the source entity, a value representing a likelihood of the source entity having a potential intention to perform an action to change the state, wherein the type of source entity is represented by a grammatical or semantic feature associated with the term representing the source entity, wherein the grammatical or semantic feature indicates whether the source entity is in a first person form, or a second person form, or a third person form;

determining whether to produce a machine response based on the value for the user input; and producing, if the value for the user input is above a threshold, a machine response comprising a description of a suggested action to be performed by the computing device for the user, wherein the value for the user input is based on predetermined numbers preset to correspond to each of a plurality of terms according to a grammatical attribute of the term, a meaning of the term, or whether the term indicates a particular commodity, wherein the value for the user input is a combination of the predetermined numbers for the terms in the user input, and wherein the value for the user input is above the threshold when the combination of the predetermined numbers for the terms in the user input is above the threshold, the threshold being another predetermined number.

2. The intelligent computing device of claim 1, wherein the suggested action is to change an operation state of a hardware device connected to the computing device or controlled by the computing device.

3. The intelligent computing device of claim 2, wherein the steps further comprise:
performing the action of changing an operation state of the hardware device to cause a change in the physical environment of the user.

4. The intelligent computing device of claim 3, wherein the hardware device comprises a home automation device or an electric or electronic appliance.

5. The intelligent computing device of claim 4, wherein the home automation device comprises at least an operation state adjuster or a switch of an electric or electronic appliance.

6. The intelligent computing device of claim 1, wherein the steps further comprise:
defining a first type of state and a second type of state associated with the source entity, respectively represented by a first group of terms and a second group of terms in a data source; and
determining the state associated with the source entity to be the first type of state if the first term is a member of the first group of terms, or determining the state associated with the source entity to be the second type of state if the first term is a member of the second group of terms.

7. The intelligent computing device of claim 6, wherein the steps further comprise:
determining the value for the user input based on whether the state associated with the source entity is the first type of state or the second type of state.

8. The intelligent computing device of claim 7, wherein the steps further comprise:
determining a greater value for the user input if the state associated with the source entity is the second type of state, or determining a smaller value for the user input if the state associated with the source entity is the first type of state.

9. A method for enabling a computing device to perform actions for a user based on linguistic analysis of a voice or text input from a user, comprising:
receiving a user input produced by a current user of the computing device, wherein a physical form of the user input comprises a text or an audio, wherein the user input contains a user expression that is in a linguistic format of a statement that is different from a directive that functions as an explicit request or command;
tokenizing the user expression into instances of terms each comprising a word or phrase;
identifying a first term in the user expression;
discovering a semantic attribute associated with the first term, wherein the semantic attribute represents a state associated with a source entity, wherein the source entity refers to a person, wherein the source entity is represented by a term in the user expression, wherein the semantic attribute is not explicitly indicated in the user expression, wherein the state comprises a physical state or mental state described by the first term;
identifying a second term in a context of the first term, wherein the context of the first term comprises one or more terms in a sentence containing the first term or related to the first term, wherein the second term represents a source entity associated with the semantic attribute;
determining, for the user input, based on the state represented by the semantic attribute, and based on a type of the source entity, a value representing a likelihood of the source entity having a potential intention to perform an action to change the state, wherein the type of source entity is represented by a grammatical or semantic feature associated with the term representing the source entity, wherein the grammatical or semantic feature indicates whether the source entity is in a first person form, or a second person form, or a third person form;
determining whether to produce a machine response based on the value for the user input; and
producing, if the value for the user input is above a threshold, a machine response comprising a description of a suggested action to be performed by the computing device for the user,
wherein the value for the user input is based on predetermined numbers preset to correspond to each of a plurality of terms according to a grammatical attribute of the term, a meaning of the term, or whether the term indicates a particular commodity,
wherein the value for the user input is a combination of the predetermined numbers for the terms in the user input, and
wherein the value for the user input is above the threshold when the combination of the predetermined numbers for the terms in the user input is above the threshold, the threshold being another predetermined number.

10. The method of claim 9, wherein the suggested action is to change an operation state of a hardware device connected to the computing device or controlled by the computing device.

11. The method of claim 10, further comprising:
performing the action of changing an operation state of the hardware device to cause a change in the physical environment of the user.

12. The method of claim 11, wherein the hardware device comprises a home automation device or an electric or electronic appliance.

13. The method of claim 12, wherein the home automation device comprises at least an operation state adjuster or a switch of an electric or electronic appliance.

14. The method of claim 9, further comprising:
defining a first type of state and a second type of state associated with the source entity, respectively represented by a first group of terms and a second group of terms in a data source; and
determining the state associated with the source entity to be the first type of state if the first term is a member of the first group of terms, or to be the second type of state if the first term is a member of the second group of terms.

15. The method of claim 14, further comprising:
determining the value for the user input based on whether the state associated with the source entity is the first type of state or the second type of state.

16. The method of claim 15, further comprising:
determining a greater value for the user input if the state associated with the source entity is the second type of state, or determining a smaller value for the user input if the state associated with the source entity is the first type of state.

* * * * *